United States Patent
Hirashima et al.

(10) Patent No.: US 6,760,285 B2
(45) Date of Patent: Jul. 6, 2004

(54) DISK DEVICE AND METHOD FOR ADJUSTING SERVO MECHANISM

(75) Inventors: Minoru Hirashima, Osaka (JP); Yasunori Kuwayama, Daito (JP)

(73) Assignee: Funai Electric Co., Ltd., Osaka (JP)

(*) Notice: Subject to any disclaimer, the term of this patent is extended or adjusted under 35 U.S.C. 154(b) by 153 days.

(21) Appl. No.: 10/212,810

(22) Filed: Aug. 7, 2002

(65) Prior Publication Data

US 2003/0039184 A1 Feb. 27, 2003

(30) Foreign Application Priority Data

Aug. 22, 2001 (JP) .................................... P.2001-251003

(51) Int. Cl.$^7$ ................................................ G11B 7/00
(52) U.S. Cl. .......................... 369/44.25; 369/44.27; 369/44.34; 369/47.1
(58) Field of Search .......................... 369/44.25, 44.27, 369/44.28, 44.34, 47.1, 53.1, 53.2, 53.41, 59.1, 59.14

(56) References Cited

U.S. PATENT DOCUMENTS

| 5,471,446 | A | * | 11/1995 | Tawaragi et al. | ........ 369/44.14 |
| 6,560,173 | B2 | * | 5/2003 | Shimamura et al. | ..... 369/44.29 |
| 6,643,239 | B2 | * | 11/2003 | Nakajo | ................... 369/53.26 |

FOREIGN PATENT DOCUMENTS

JP          7-153210          6/1995

* cited by examiner

Primary Examiner—Muhammad Edun
(74) Attorney, Agent, or Firm—Morgan, Lewis & Bockius LLP

(57) ABSTRACT

Focusing balance adjustment of adjusting a servo mechanism is executed so that reproduction quality is optimum in a state where a focusing servo is active (#5). Thereafter, tracking balance adjustment of adjusting the servo mechanism is executed so that a tracking balance deviation is cancelled which is an amplitude difference between the upper side and lower side relative to a reference level of a waveform generated in a tracking error signal when the focal point of a light beam applied to the disk crosses a track of the disk (#7).

3 Claims, 4 Drawing Sheets

DISK DEVICE AND METHOD FOR ADJUSTING SERVO MECHANISM

BACKGROUND OF THE INVENTION

This invention relates to a disk device for carrying out at least one of recording and reproducing of information by irradiating a disk-shaped recording medium or a disk with a light beam, and a method of adjusting a servo mechanism of creating a focusing error signal indicative of a deviation of the focal point of a light beam applied onto a disk from a recording face of the disk and a tracking error signal indicative of a deviation of the focal point of the light beam applied onto the disk from a track on the disk on the basis of the common light reflected from the disk and further executing a focusing servo of controlling the focal point of the light beam applied on the disk to follow a recording face of the disk and a tracking servo of controlling the focal point of the light beam applied on the disk to follow the track on the disk.

The disk device is provided with a servo mechanism of creating a focusing error signal indicative of a deviation of the focal point of a light beam applied onto a disk from a recording face of the disk and a tracking error signal indicative of a deviation of the focal point of the light beam applied onto the disk from a track on the disk on the basis of the common light reflected from the disk and further executing a focusing servo of controlling the focal point of the light beam applied on the disk to follow a recording face of the disk and a tracking servo of controlling the focal point of the light beam applied on the disk to follow the track on the disk.

In a disk device for carrying out recording or reproducing of information for a DVD which is a kind of an optical disk, a single-beam phase difference system is generally adopted in order to create a tracking error signal. As shown in FIG. 3, the single beam phase difference system is to take a sum of output signals A and C and a sum of output signals B and C from four segments on diagonal lines into which a photo-diode 101 divided to receive light reflected from the disk to acquire a tracking error TE which is a signal indicative of a phase difference between these two sum signals A+C and B+D. In this case, generally, a level difference between the two sum signals A+C and B+D is used as a focusing error FE. Namely, the focusing error and tracking error are created on the basis of the common light reflected from the disk.

Meanwhile, whenever the disk is replaced by another disk, the disk device performs focusing balance adjustment and tracking balance adjustment. The focusing balance adjustment is to adjust the servo mechanism so that the reproduction quality is optimum while the focusing servo is active.

Incidentally, information is reproduced from the disk when the full-added signal (sum signal of A+B+C+D of output signals A, B, C and D from the four segments of the photo-diode 101 in FIG. 3) is processed as a signal read from the disk). The reproduction quality is improved as the amplitude of the full-added signal increases. Therefore, in order to perform the focusing balance adjustment, for example, the servo mechanism may be adjusted so that the amplitude of the full-added signal is maximum while the focusing servo is active.

The tracking balance adjustment is to adjust the servo mechanism so that the amplitude difference (hereinafter referred to as "tracking balance deviation") between an upper side and lower side relative to zero (reference level) of a waveform occurring in the tracking error signal when the focal point of the light beam applied on the disk crosses a track of the disk is cancelled.

Incidentally, since the disk has eccentricity, in a state where the disk rotates and the tracking servo is not active, the focal point of the light beam applied to the disk crosses the track of the disk. Therefore, in order to perform the tracking balance adjustment, the servo mechanism may be adjusted so that the DC component of the tracking error signal is zero (reference level) in a state where the disk rotates and the tracking servo is not active.

In order to perform the focusing balance adjustment accurately, since this adjustment is performed on the basis of the amplitude of the full-added signal, it must be performed in a state where the tracking servo operates normally (the focal point of the light beam applied to the disk follows the track on the disk).

On the other hand, if the tracking balance deviation is too large, the tracking servo does not operate normally (even when the tracking servo is made active, the focal point of the light beam applied onto the disk does not follow the track on the disk). In other words, unless the tracking balance is somewhat small, the tracking servo does not operate normally and hence the focusing balance adjustment cannot be performed.

In view of the fact as described above, in a conventional method of adjusting the servo mechanism, in order to assure accurate focusing balance adjustment, the focusing balance adjustment was performed after the tracking balance adjustment had been performed. Further, in a series of operations for adjusting the servo mechanism, the tracking balance was not performed after the focusing balance adjustment had been performed.

Incidentally, the Unexamined Japanese Patent Application No. Hei7-153210 discloses that the tracking balance adjustment is performed after the focusing balance adjustment is performed. However, this is not relative to a servo mechanism in which the focusing error signal and tracking error signal are created on the basis of the common beam of light reflected from the disk as in a single beam phase difference system, but the servo mechanism of a three-beam system (in which the focusing error signal and tracking error signal are created on the basis of different beams of light reflected from the disk).

However, in a servo mechanism in which the focusing error signal and tracking error signal are created on the basis of the common beam of light reflected from the disk as in a single beam phase difference system, implementation of the focusing balance adjustment influences the tracking error signal.

Therefore, in the conventional method of adjusting the servo mechanism, even after the tracking balance adjustment is performed, the subsequent focusing balance adjustment generates the tracking balance deviation. As a result, the tracking balance deviation cannot be cancelled. In the state where the tracking balance deviation has not been cancelled, the focal point of the light beam applied on the disk cannot follow the track of the disk so that the recording quality of information and the reproducing quality for the disk will be attenuated.

SUMMARY OF THE INVENTION

Thus, this invention intends to provide a method of adjusting a servo mechanism in which the focusing error and tracking error are created on the basis of the common light reflected from a disk and which tracking balance deviation can be surely shifted.

In order to attain the above object, this invention provides a disk device for carrying out at least one of recording and reproducing of information by irradiating a disk-shaped recording medium or a disk with a light beam, comprising:

a photo-diode divided into four segments for receiving light reflected by the disk;

a focusing error signal creating circuit for creating a focusing error signal which is a level difference between a first sum signal indicative of a sum of output signals from two segments on one diagonal line of the photo-diode and a second sum signal indicative of a sum of output signals from two segments on the other diagonal line thereof;

a tracking error signal creating circuit for creating a tracking error signal indicative of a phase difference between the first sum signal and the second sum signal;

a focusing drive signal creating circuit for creating a focusing drive signal to set the value of the focusing error signal at the reference level;

a tracking drive signal creating circuit for a tracking drive signal to set the value of the tracking error signal at the reference level;

a focusing actuator for moving a focal point of the light beam applied on the disk in an optical axis direction of the light beam;

a tracking actuator for moving a focal point of the light beam applied on the disk in a radial direction of the disk;

a driver for driving the focusing actuator and the tracking actuator on the basis of the focusing drive signal and the tracking driving signal, respectively;

a servo mechanism adjusting circuit for performing focusing balance adjustment of adjusting the focusing error signal creating circuit so that the reproduction quality is optimum in a state where focusing servo of controlling the focal point of the light beam applied on the disk to follow a recording face of the disk is active, tracking balance rough adjustment of adjusting the error signal creating circuit so that tracking balance deviation becomes small to such an extent that a tracking servo operates normally, the tracking balance deviation being indicative of an amplitude difference between an upper side and lower side relative to the reference level of a waveform generated in the tracking error signal when the focal point of the light beam applied on the disk crosses a track of the disk, the tracking servo controlling the focal point of the light beam applied on the disk to follow a track of the disk, and tracking balance fine adjustment of adjusting the tracking error signal creating circuit so that the tracking balance deviation is cancelled, wherein when it is recognized that a disk is replaced by another disk, the balance adjusting circuit executes the adjustment in the order of the tracking balance rough adjustment, the focusing balance adjustment and the tracking balance fine adjustment.

In accordance with this configuration, even when the tracking balance deviation occurs as a result of the focusing balance adjustment, the tracking balance deviation can be surely cancelled. In addition, prior to executing the focusing balance adjustment, the tracking balance servo operates normally. This assures accurate focusing balance adjustment.

This invention also provides a method of adjusting a servo mechanism wherein a focusing error and a tracking error are created on the basis of common light reflected from a disk which is a disk-shaped recording medium, the focusing error being indicative of a deviation of a light beam applied on the disk from the recording face of the disk, the tracking error being indicative of a deviation of the light beam applied to the disk from a track of the disk, and focusing servo and tracking servo are executed, the focusing servo controlling the focal point applied to the disk to follow the recording face of the disk, the tracking servo controlling the focal point applied to the disk to follow the track of the disk, wherein after focusing balance adjustment of adjusting the focusing error signal creating circuit is executed so that the reproduction quality is optimum in a state where the focusing servo is active, tracking balance fine adjustment of adjusting the servo mechanism so that the tracking balance deviation is cancelled the tracking balance deviation being indicative of an amplitude difference between an upper side and lower side relative to the reference level of a waveform generated in the tracking error signal when the focal point of the light beam applied to the disk crosses the track of the disk.

In accordance with this method, even when the tracking balance deviation occurs as a result of the focusing balance adjustment, the tracking balance deviation can be surely cancelled.

Incidentally, preferably, prior to executing the focusing balance adjustment, tracking balance rough adjustment of adjusting the servo mechanism is executed so that the tracking balance deviation becomes small to such an extent that the tracking servo functions normally. In this way, the tracking servo operates normally prior to executing the focusing balance adjustment. This assures accurate focusing balance adjustment.

DETAILED DESCRIPTION OF THE PREFERRED EMBODIMENTS

Figure 1:
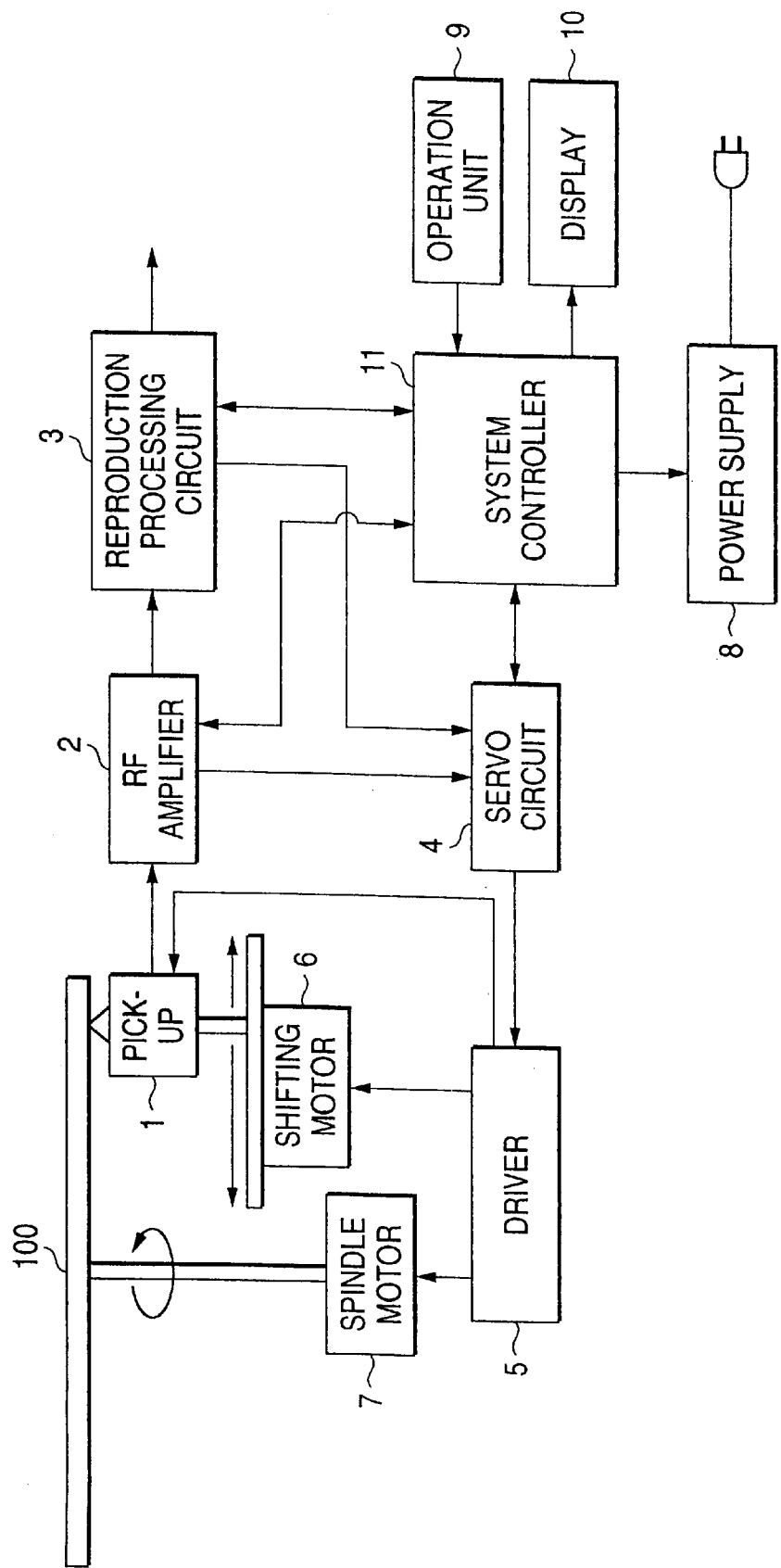
FIG. 1 is a block diagram of the disk device according to an embodiment of this invention.

Now referring to the drawings, an explanation will be given of an embodiment of this invention. FIG. 1 is a block diagram of a disk device which is an embodiment of this invention. A disk 100 is irradiated with a laser beam from a pick-up 1, and the light reflected from the disk is converted into an electric signal. Thus, the signal recorded on the disk is optically read. Incidentally, the pick-up 1 includes a focusing actuator for moving the focal point of the laser beam applied to the disk 100 in an optical axis thereof and a tracking actuator for moving the laser beam 100 in a radial direction of the disk 100.

An RF amplifier 2 amplifies the signal read by the pick-up 1 and supplies the amplified signal to a reproduction processing circuit 3, and also creates a focusing error signal and a tracking error signal to be supplied to a servo circuit 4. The reproduction processing circuit 3 reproduces the information by subjecting the signal supplied from the RF amplifier 2 to demodulation processing, error detection/correction processing, etc. The reproduction processing circuit 3 creates the signal indicative of the rotary speed of the disk on the basis of the signal supplied from the RF amplifier 2, which is in turn supplied to the servo circuit 4.

The servo circuit 4 creates a focusing driving signal for making the value of the focusing error signal FE zero (reference level) and a tracking drive signal for making the value of the tracking error signal zero (reference level) on the basis of the focusing error signal and the tracking error signal supplied from the RF amplifier 2, respectively and also creates a shifting motor drive signal. The servo circuit 4 creates a spindle motor drive signal for setting the rotary speed of the disk 100 at a target value on the basis of a signal indicative of the rotary speed of the disk 100 which is supplied from the reproduction processing circuit 3.

A driver 5 drives the focusing actuator, the tracking actuator, a shifting motor 6 and a spindle motor 7 arranged within the pick-up 1 on the basis of the focusing drive signal, tracking drive signal, shifting motor drive signal and spindle motor drive signal, respectively. The shifting motor 6 serves to move the pick-up 1 in a radial direction of the disk 100. The spindle motor 7 serves to rotate the disk 100.

Thus, with the aid of the pick-up 1, RF amplifier 2, servo circuit 4, driver 5, shifting motor 6 and spindle motor 7, a servo mechanism is constructed to execute a focusing servo for controlling the focal point of the laser beam applied to the disk to follow the recording face of the disk, a tracking servo for controlling the focal point of the laser beam applied to the disk to follow the track of the disk 100, and a spindle servo for controlling the rotary speed of the disk to be a prescribed value. Incidentally, the focusing error signal is created by astigmatism and the tracking error signal is created by the single beam phase difference technique.

A power supply 8 creates a suitable DC voltage from a commercial AC power source, and supplies this DC voltage to respective components as a power supply voltage through wirings (not shown). An operation unit 9 serves to permit a user to input various instructions to the disk device. The instruction inputted to the disk device by the user is supplied to a system controller 11.

A display 10 displays a time, information indicative of the operation state of the disk device, information (e.g. title of the music being reproduced) relative to the data during reproduction, etc. The system controller 11 is constructed of e.g. a microcomputer, and controls the components of the disk device in accordance with the instruction inputted to the disk device by the user.

Figure 2:
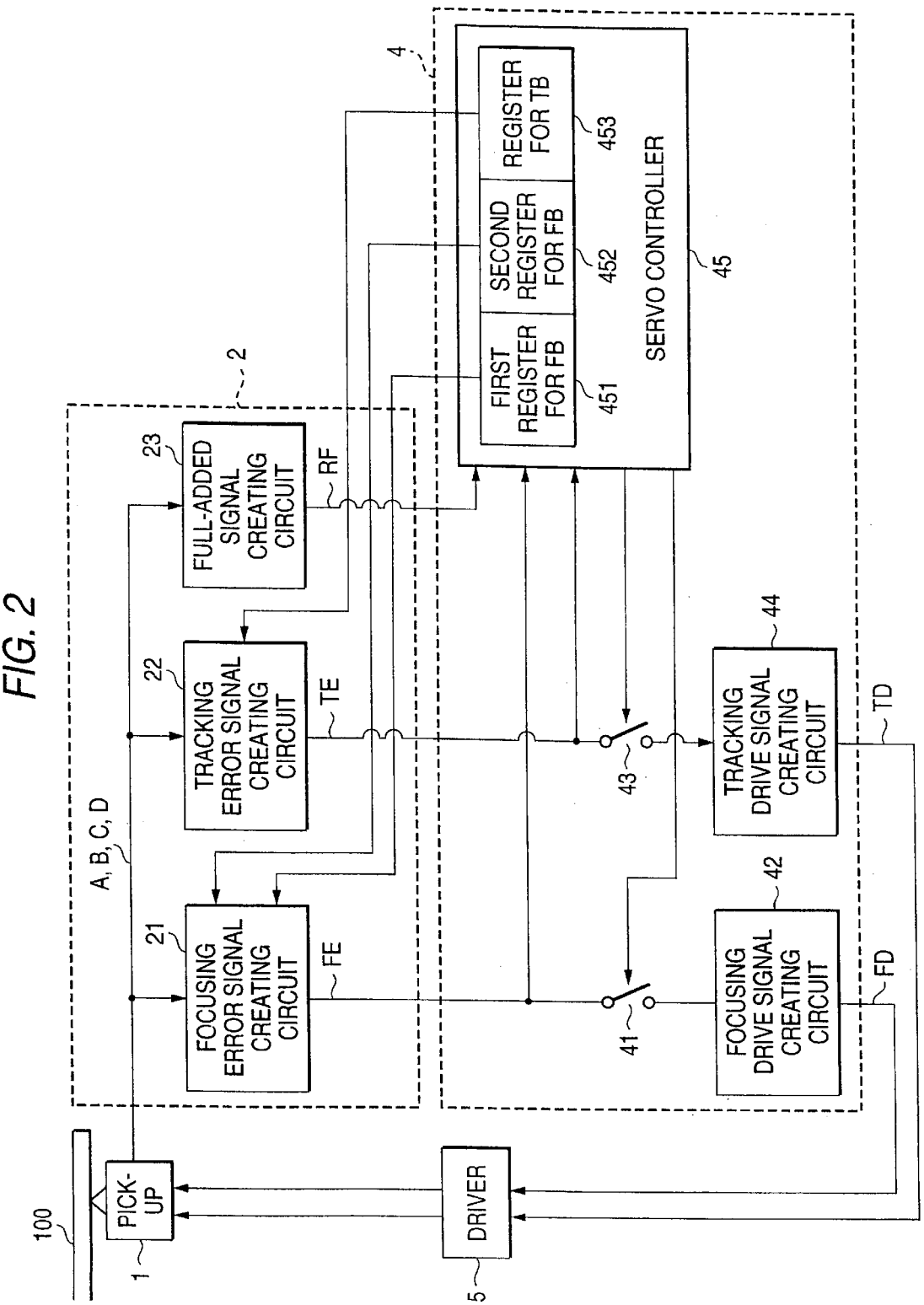
FIG. 2 is a block diagram of the section relative to only the focusing servo mechanism and the tracking servo mechanism of the disk device shown in FIG. 1.
Figure 3:
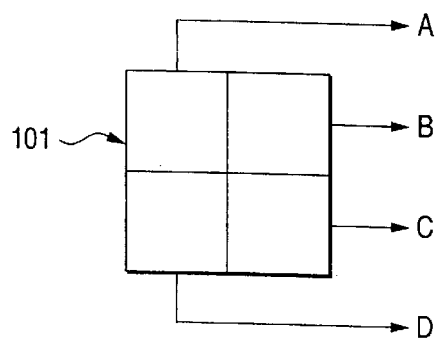
FIG. 3 is a view for explaining the photo-diode of a pick-up.

FIG. 2 is a block diagram of the section relative to only the focusing servo mechanism and the tracking servo mechanism of the disk device shown in FIG. 1. The pick-up 1 includes a photo-diode 101 divided into four segments for receiving the light reflected from the disk. The output signals A, B, C and D from the respective segments are supplied to the RF amplifier 2.

A focusing error signal creating circuit 21 takes a sum of the output signals A and C from the segments on a diagonal line of the photo-diode 101 and another sum of the output signals B and D from the segments on another diagonal line thereof to create a signal indicative of a level difference between these two sum signals A+C and B+D as a focusing error signal FE.

A tracking error signal creating circuit 22 takes a sum of the output signals A and C from the segments on a diagonal line of the photo-diode 101 and another sum of the output signals B and D from the segments on another diagonal line thereof to create a signal indicative of a phase difference between these two sum signals A+C and B+D as a tracking error signal TE.

An RF signal creating circuit 23 creates a full-added signal which is a sum signal of the output signals A, B, C and D from the four segments of the photo-diode 101. Incidentally, the full-added signal RF is processed as a signal read from the disk 100 by the reproduction processing circuit 3 so that the information recorded on the disk 100 is reproduced.

The focusing error signal FE is supplied to the focusing drive signal creating circuit 42 through a switch 41 and also to a servo controller 45. The focusing drive signal creating circuit 42 creates a focusing drive signal FD for making the value of the focusing error signal FE zero (reference level) on the basis of the focusing error signal FE.

A driver 5 drives the focusing actuator within the pick-up 1 on the basis of the focusing drive signal FD. Thus, the focusing actuator is controlled so that the value of the focusing error signal FE becomes zero (reference level) (Namely, the focal point of the laser beam applied to the disk 100 follows the recording face of the disk 100).

The tracking error signal TE is supplied to a tracking drive signal creating circuit 44 through a switch 43 and also supplied to the servo controller 45. The tracking drive signal creating circuit 44 creates a tracking drive signal TD for making the value of the tracking error signal TE zero (reference level) on the basis of the tracking error signal TE.

The driver 5 drives the tracking actuator within the pick-up 1 on the basis of the tracking drive signal TD. Thus, the tracking actuator is controlled so that the value of the tracking error signal TE becomes zero (reference level) (Namely, the focal point of the laser beam applied to the disk 100 follows the track of the disk 100).

The full-added signal RF is supplied to the servo controller 45. The servo controller 45 controls the start of the focusing servo and tracking servo using the switches 41 and 43, respectively. When the switch 41 is turned ON, the focusing servo is started. When the switch 41 is turned OFF, the focusing servo is stopped. Further, when the switch 43 is turned ON, the tracking servo is started. When the switch 43 is turned OFF, the tracking servo is stopped. Further, the servo controller 45 includes a first register 451 for adjusting focusing balance, a second register 452 for adjusting focusing balance and a register 453 for adjusting tracking balance.

Figure 4:
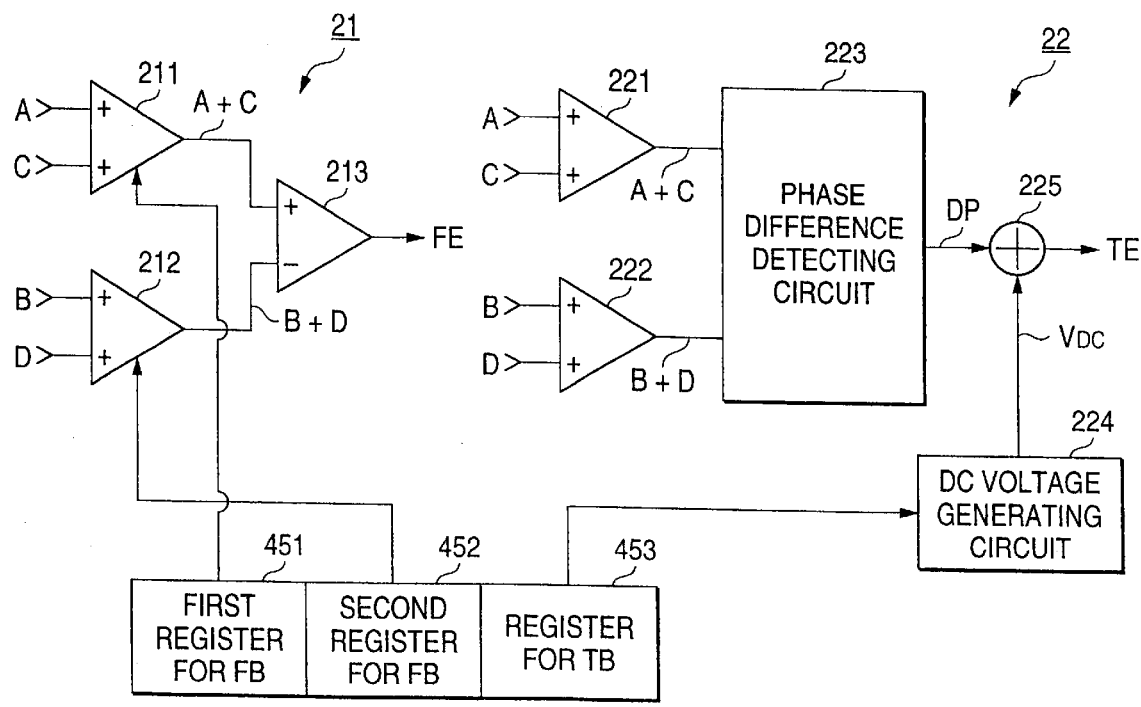
FIG. 4 is a view showing an exemplary configuration of a focusing error signal creating circuit and a tracking error signal creating circuit.

The focusing error signal creating circuit 21, as shown in FIG. 4, includes a circuit 211 for taking a sum of the outputs A+C from the segments on a diagonal line of the photo-diode 101 within the pick-up 1, a circuit 212 for taking another sum of the outputs B+D from the segments on another diagonal line thereof and a circuit 213 for creating a signal indicative of a level difference between the two sum signals A+C and B+D to create the output signal from the circuit 213 as a focusing error signal FE.

The circuits 211 and 212 are designed so that their gains are varied according to the values of the first register 451 for adjusting focusing balance and the second register 452 for adjusting focusing balance within the servo controller 45, respectively. Namely, the servo controller 45 can perform the focusing balance adjustment by setting the values of the registers so that the amplitude of the full-added signal RF is maximum in a state where the focusing servo is active.

The tracking error signal creating circuit 22, as shown in FIG. 4, includes a circuit 221 for taking a sum of the outputs A+C from the segments on a diagonal line of the photo-diode 101 within the pick-up 1, a circuit 222 for taking another sum of the outputs B+D from the segments on another diagonal line thereof and a circuit 223 for creating a signal indicative of a phase difference between the two sum signals A+C and B+D, a circuit 224 for generating a DC voltage $V_{DC}$ and a circuit 225 for adding the signal DP and the DC voltage $V_{DC}$ to create the output signal from the circuit 225 as a tracking error signal TE.

The DC voltage generating circuit 224 is designed so that the DC voltage $V_{DC}$ outputted thereof varies according to the value of the register 453 for adjusting tracking balance within the servo controller 45. The servo controller 45 can adjust the tracking balance deviation by rewriting the value of the register 453 for adjusting tracking balance.

Figure 5:
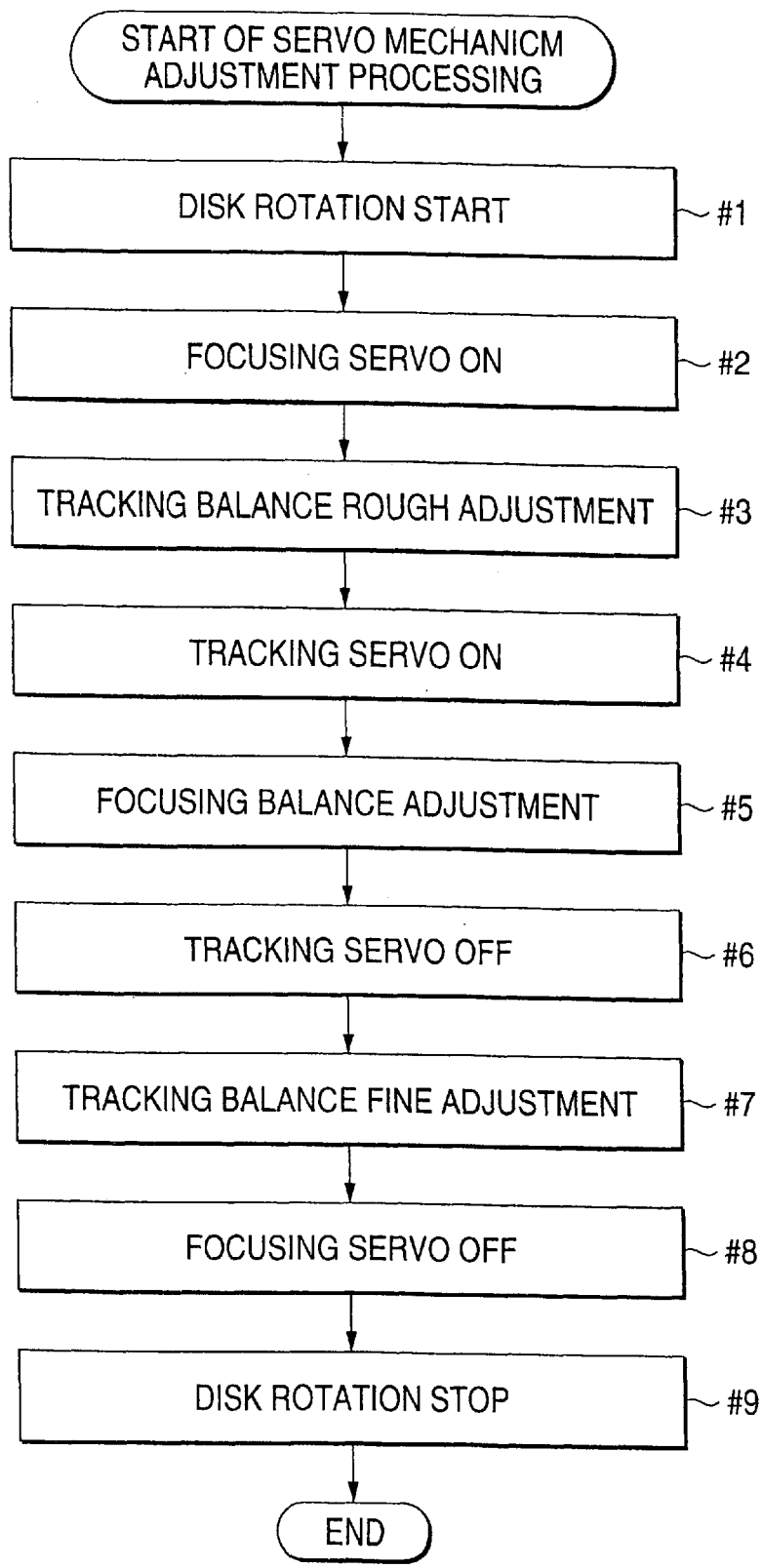
FIG. 5 is a flowchart of the servo mechanism adjustment processing which is executed by a servo controller.

Referring to the flowchart shown in FIG. 5, and explanation will be given of the servo mechanism adjustment processing which is performed by the servo controller 45 where an instruction of requesting the adjustment of the servo mechanism is given from the system controller 11. Incidentally, the system controller 11 is designed so that when it recognizes that the disk 100 is replaced by another disk, it supplies an instruction of requesting the adjustment of the servo mechanism to the servo controller 45.

First, the rotation of the disk 100 is started (#1) Next, the focus search (by driving the focusing actuator within the pick-up 1, to repeat alternately the operation of moving the focal point of the laser beam applied to the disk 100 to approach the disk and the operation of moving it to leave the disk) is started and thereafter at an appropriate timing (point where the value of the focusing error signal crosses zero (reference level), the switch 41 is turned ON to start the focusing servo (#2).

The tracking balance is adjusted so that the tracking balance deviation decreases to such an extent that the tracking servo operates normally (Hereinafter, this adjustment is referred to as "tracking balance rough adjustment") (#3). Next, the switch 43 is turned ON to start the tracking servo (#4). Subsequently, the focusing balance adjustment is performed (#5).

The switch 43 is turned OFF to stop the tracking servo (#6). Next, the tracking balance is adjusted so that the tracking balance deviation is cancelled (Hereinafter this adjustment is referred to as "tracking balance fine adjustment") (#7). Upon completion of the processing of #7, the switch 41 is turned OFF to stop the focusing servo (#8). Thereafter, the rotation of the disk 100 is stopped (#9) to complete the servo mechanism adjustment processing.

In this way, in this embodiment, in a servo mechanism of the system in which the focusing error signal and tracking error signal are created on the basis of the common light reflected from the disk, after the focusing balance adjustment is performed, the tracking balance adjustment is performed. Therefore, even when the tracking balance deviation occurs as a result of the focusing balance adjustment, the tracking balance deviation can be surely cancelled.

In this embodiment, prior to executing the focusing balance adjustment, the tracking balance rough adjustment is performed so that the tracking servo operates normally. This assures accurate focusing balance adjustment.

Incidentally, prior to executing the focusing balance adjustment, the tracking balance fine adjustment may be executed in place of the tracking balance rough adjustment. However, since the time taken for the tracking balance rough adjustment is shorter than that taken for the tracking balance fine adjustment, to execute the tracking balance rough adjustment prior to executing the focusing balance fine adjustment can save the time taken for the adjustment of the servo mechanism.

In this embodiment, the disk device having only the function of reproducing information from the disk was explained. However, this invention can be applied to the disk having both functions of recording the information on the disk and reproducing the information from the disk.

As explained hitherto, in accordance with this invention, in a servo mechanism of the system in which the focusing error signal and tracking error signal are created on the basis of the common light reflected from the disk, the tracking balance deviation can be surely cancelled.

Further, in accordance with this invention, the above effect as well as assurance of accurate focusing balance adjustment can be obtained.

What is claimed is:

1. A disk device for carrying out at least one of recording and reproducing of information by irradiating a disk-shaped recording medium or a disk with a light beam, said disk device comprising:

a photo-diode divided into four segments for receiving light reflected by the disk;

a focusing error signal creating circuit for creating a focusing error signal which is a level difference between a first sum signal indicative of a sum of output signals from two segments on one diagonal line of said photo-diode and a second sum signal indicative of a sum of output signals from two segments on the other diagonal line thereof;

a tracking error signal creating circuit for creating a tracking error signal indicative of a phase difference between the first sum signal and the second sum signal;

a focusing drive signal creating circuit for creating a focusing drive signal to set the value of said focusing error signal at the reference level;

a tracking drive signal creating circuit for a tracking drive signal to set the value of said tracking error signal at the reference level;

a focusing actuator for moving a focal point of the light beam applied on the disk in an optical axis direction of the light beam;

a tracking actuator for moving a focal point of the light beam applied on the disk in a radial direction of the disk;

a driver for driving said focusing actuator and said tracking actuator on the basis of said focusing drive signal and said tracking driving signal, respectively;

a servo mechanism adjusting circuit for executing focusing balance adjustment of adjusting said focusing error signal creating circuit so that the reproduction quality is optimum in a state where focusing servo of controlling the focal point of the light beam applied on the disk to follow a recording face of the disk is active; tracking balance rough adjustment of adjusting said error signal creating circuit so that tracking balance deviation becomes small to such an extent that a tracking servo operates normally, the tracking balance deviation being indicative of an amplitude difference between an upper side and lower side relative to the reference level of a waveform generated in said tracking error signal when the focal point of the light beam applied on the disk crosses a track of the disk, said tracking servo of controlling the focal point of the light beam applied on the disk to follow a track of the disk; and tracking balance fine adjustment of adjusting said tracking error signal creating circuit so that the tracking balance deviation is cancelled, wherein when it is recognized that a disk is replaced by another disk, said balance adjusting circuit executes the adjustment in the order of said tracking balance rough adjustment, said focusing balance adjustment and said tracking balance fine adjustment.

2. A method of adjusting a servo mechanism wherein a focusing error and a tracking error are created on the basis of common light reflected from a disk which is a disk-shaped recording medium, said focusing error being indicative of a deviation of a light beam applied on the disk from the recording face of said disk, said tracking error being indicative of a deviation of the light beam applied to the disk from a track of the disk, said method comprising the steps of:

executing focusing servo and tracking servo, said focusing servo controlling the focal point applied to the disk to follow the recording face of the disk, said tracking servo controlling the focal point applied to the disk to follow the track of the disk, and after focusing balance adjustment of adjusting said focusing error signal creating circuit is executed so that the reproduction quality is optimum in a state where said focusing servo is active, tracking balance fine adjustment of adjusting said servo mechanism so that the tracking balance deviation is cancelled, said tracking balance deviation being indicative of an amplitude difference between an upper side and lower side relative to the reference level of a waveform generated in said tracking error signal when the focal point of the light beam applied to the disk crosses the track of the disk.

3. The method of adjusting a servo mechanism according to claim 2, wherein prior to executing the focusing balance adjustment, tracking balance rough adjustment of adjusting said servo mechanism is executed so that said tracking balance deviation becomes small to such an extent that said tracking servo operates normally.

* * * * *